United States Patent [19]
Damitz

[11] Patent Number: 4,898,026
[45] Date of Patent: Feb. 6, 1990

[54] PROCESS FOR TESTING DRIVING AXLES AND DEVICE FOR PERFORMING THE PROCESS

[75] Inventor: Joerg P. Damitz, Runkel, Fed. Rep. of Germany

[73] Assignee: Glyco Antriebstechnik GmbH, Wiesbaden, Fed. Rep. of Germany

[21] Appl. No.: 273,858
[22] PCT Filed: Dec. 9, 1987
[86] PCT No.: PCT/DE87/00586
§ 371 Date: Sep. 29, 1988
§ 102(e) Date: Sep. 29, 1988
[87] PCT Pub. No.: WO88/04417
PCT Pub. Date: Jun. 16, 1988

[30] Foreign Application Priority Data

Dec. 13, 1986 [DE] Fed. Rep. of Germany ....... 3642717

[51] Int. Cl.⁴ ............................................ G01M 19/00
[52] U.S. Cl. ................................... 73/118.1; 73/865.6
[58] Field of Search ...................... 73/865.6, 118.1, 162

[56] References Cited

FOREIGN PATENT DOCUMENTS 3020391 12/1981 Fed. Rep. of Germany .
3410702 9/1985 Fed. Rep. of Germany .
3424923 2/1986 Fed. Rep. of Germany .
3545335 7/1987 Fed. Rep. of Germany .
653529 3/1979 U.S.S.R. .............................. 73/118.1
1286920 1/1987 U.S.S.R. .............................. 73/118.1

OTHER PUBLICATIONS

Test Rigs by Glyco-Antriebstechnik GmbH, pamphlet, in English and German, and explanation of Clamping Test Bench for Drive Axles.
ATZ Automobiletchnische Zeitschrift 75 (1973)9–Dipl Ing E. Gohring, Ing.(grad) W. Hopf, Dipl Ing P. Strifler, Stuttgart, pp. 308–314.

Primary Examiner—Jerry W. Myracle
Attorney, Agent, or Firm—Herbert Dubno

[57] ABSTRACT

A method of and apparatus for testing axles for motor vehicles and especially the drive axles for trucks, has a testing stand in which the axles are supported and connected to a drive motor and load. In addition to the driving forces which can thus be applied to the axle shaft, the axle housing can be loaded to represent truck loading and can be subjected to torsional stresses like those which are generated when the truck is inclined in driving. The shaft ends are laterally loaded as well to represent reaction forces from the wheel disks. The method and apparatus enable total testing of the functions of the axle under simultaneous drive and carrying conditions in a single operation on the stand.

18 Claims, 3 Drawing Sheets

PROCESS FOR TESTING DRIVING AXLES AND DEVICE FOR PERFORMING THE PROCESS

CROSS REFERENCE TO RELATED APPLICATIONS

This application is a national phase application corresponding to PCT/DE87/00586 which is based, in turn, on German National Application P 36 42 2717.9 filed 13 December 1986 under the International Convention.

FIELD OF THE INVENTION

My present invention relates to a process for testing driving axles wherein the driving axle is mounted in a test stand driven from the driving side and braked from the driven side.

Further, the invention relates to a device for testing driving axles for motor vehicles, consisting of a driving unit, which is generally linked to the axle transmission by an axle drive shaft and composed of an axle housing with linking elements between the axle shafts and a braking unit opposing resistance to rotation.

The term "driving axle" as used here encompasses the entire unit consisting of axle housing, axle transmission, and one or several driving axles, whereby the axle transmission is driven by an external driven shaft, shifting the thereby produced torque and transmitting it to the axle shaft, which in turn is linked on a driven side with the so-called "driving wheel", which in a test stand is replaced by the so-called "wheel mounting". The ideal image formed by mathematical lines, whereupon the axle shafts revolve and which occasionally are also called "axes", are subsequently called "rotation axes" in order to be better distinguished from the rest.

BACKGROUND OF THE INVENTION

Processes of the afore-described kind and also the corresponding test stands are sufficiently well known. Particularly well known are processes and devices for testing driving axles for trucks, to which the present invention is primarily to be applied. However, the features of the process and the device can also be applied without any further ado to other driving axles, wherein for instance only one single axle shaft is provided, which optionally can be directly driven or whose axle transmission does not have a differential.

The known processes and devices for the testing of driving axles have the disadvantage that the testing is done under conditions which do not match the conditions under which the vehicle will later operate at all or are only able to match them to a limited extent. So, for instance, the axle housing is securely mounted in a frame, while the driven sides of the axle shafts are connected in a wheel mounting with a rotatable part, which is either directly braked or in turn drives a generator, which this way converts the energy transmitted by the axle shaft into electric current and also exerts a braking effect on the shaft, so that the entire axle is loaded with respect to its main function, namely the shifting and transmission of torque.

But later, during its operation, for instance of a driving axle mounted in a truck, conditions arise which cannot be duplicated with the state of the art testing processes and the state of the art testing devices. Instead, in addition to the described purely functional test, further testing of the axle with other test stands and other test methods has to be done, wherein the axle is loaded statically and dynamically, but wherein it can not be rotationally driven. As a result, several tests have to be performed on the axle in succession and these tests actually furnish results of little value.

Finally, further complicated testing has to be done under traffic conditions, i.e. with a driving axle mounted in a vehicle or another device, which are correspondingly time-consuming and costly.

OBJECT OF THE INVENTION

It is the object of the present invention to provide an imporved testing process, as well as a testing device which will make it possible to test driving axles under conditions coming as close as possible to actual operational and traffic conditions.

SUMMARY OF THE INVENTION

This object is attained, in accordance with the invention in a process wherein during the testing of the total function of the axle, consisting of driving and carrying functions, the axle is placed under load by additional forces, which do not depend on the drive and the brake.

Thus, while with the state of art process a driving axle was tested exclusively separate with respect to its driving function (shifting, conversion and transmission of torque), and independently therefrom with respect to its carrying function (load), in accordance with the invention, these two testing processes are performed in one single testing process. The advantage of the process according to the invention lies not only in the gain in time and assembly work, but also and mainly in the fact that the testing conditions for the driving axle are much more realistic, since all concerned loads or additional forces acting upon the axle, have also an influence on the driving axle as a torque-transmitting unit.

The creation of such realistic operation conditions was up to now possible only when using the driving axle in traffic conditions, when a corresponding driving axle was mounted in a truck and this truck then would perform test drives. Of course such a procedure is extraordinarily cumbersome and, in addition, the survey of the functions and the control of the load forces to which the driving axle is subjected can be performed only with difficulty with such a process.

The process according to the invention combines on the one hand the advantages of a testing under realistic conditions (as for instance in test drives) with the advantages of the testing on a test stand, which, corresponding to the desired data, is equipped with reading and measuring instruments.

The load produced by the additional forces mentioned above can consist of a predeterminable static basic load and an additional load, selectable according to size and frequency.

From the point of view of a pure axle load, conditions similar to those of a loaded truck traveling over uneven ground can be simulated.

Static based load and time-variable additional load are considered not only with respect to vertically acting axle loads, but also with respect to propulsion, braking and acceleration forces or to flexural torque as it occurs at curves or in the case of sideward inclinations.

The advantages of the present invention will be most apparent from examples in the field of motor vehicles or trucks. It is, however, self-understood that the features of the invention can be applied with the corresponding advantages also to other driving axles, such as boat drives or, generally, machine drives.

According to the invention, it is provided that the additional forces include propulsive forces. Such forces occur during braking and acceleration of motor vehicles and can amount to a value comparable to that of the weight of a vehicle, whereby the resulting force is a summation of the weight force and the propulsive force, through vectoral addition of the weight force and the propulsive force and has to be absorbed by the bearings between the axle shaft and the axle housing.

Also in accordance with the invention, it is provided that the additional forces include flexural torque.

As already mentioned, such flexural torque occurs when passing through curves or when a vehicle is in a sidewardly inclined position, since a laterally acting mass or inertial force, which theoretically acts of the gravity center of the vehicle, can be compensated by a frictional force in the tire contact area, so that all-together a torque acting on the vehicle, with reference to the tire contact area results, whereby the axles or the axle shafts are under the stress of flexural torque.

The afore-mentioned additional forces complete the system of forces to which the axle can be subjected, so that generally, during testing, realistic operational conditions can be simulated.

In the preferred embodiment of the invention it is provided that the driving axle is integrated into a closed transmission circuit and is set under load. In this connection, the gear loading refers to the transmission circuit, which is set under load in such manner that various operational conditions can be simulated, depending on the degree of loading, conditions such as they occur during acceleration or up-hill driving under heavy load. The closed-circuit transmission has thereby the advantage that the total energy to be used for driving a test axle has to be equal to the energy converted into frictional heat in the entire transmission circuit. Additional energy, in order to produce on the driven side frictional heat in a brake, or joule heat and additional current in a generator is not required, since the driving- and the driven side are intercoupled, and any energy surplus on the driven side can be made available at the driving side. Thus, the process also works with a lower specific energy consumption.

Finally, the process according to the invention, provides that the closed-circuit transmission contain at least two objects to be tested in a row.

Since it is anyway necessary to have additional transmission elements in order to close the transmission circuit, this can be done cleverly through a second object to be tested, i.e. a second driving axle. This offers not only the advantage of simultaneous testing of two driving axles, but also the possibility to establish the product accuracy caused by finishing tolerances.

The device for testing driving axles for trucks, comprises a driving unit generally linked by a driving shaft to the axle transmission, consisting of an axle housing with linking elements between the axle shafts and a braking unit producing the resistance to rotation. According to the invention, at the frame rigidly connected to the base or mounting plate, force-transmitting elements are provided, which on one side are connected to the axle housing and the axle shaft and on the other side, with the frame or the mounting plate.

In this connection, it is self-understood that the force-transmitting elements do not only have a holding function, but transmit preselectable and well defined forces or make possible the measurement of the forces acting thereon or transmitted by them. These force-transmitting elements can on the one hand engage at the axle housing, as well as the axle shaft, while the reference point is formed by the frame, the foundation, or the parts which are rigidly connected thereto.

As a rule, such a device makes possible not only the testing of the axle functioning purely as a torque transmission system, but also the way it functions under additional loads.

In order to insure the axle loading, in accordance with the invention, it has been found to be advantageous to provide a crossbar over the axle and to connect this bar with the axle housing via spring elements.

With the aid of such a crossbar, the axle housing can be subjected to axle loads in vertical direction, which then also act upon the axle shaft through the axle bearings. Since, in reality, axle loads are usually supported by spring suspension, here also suitable spring suspension elements are provided as force-transmitting elements. These can also at the same time serve for measuring the transmitted forces.

Advantageously, the invention provides further that the axle housing be at least limitedly rotatable around the axle shaft with respect to the frame and connected to a force absorber running essentially tangential to the theoretical wheel, through a lever of a length basically equivalent to half of the wheel diameter.

Such a force absorber measures directly the propulsive force driving the vehicle and which, according to the Newtonian principle of action=reaction, acts also on the corresponding axle bearings. This force is produced by the reaction torque acting upon the axle housing, rotatable at least to a certain limit, when a resistance to rotation is opposed to the driving axle.

The preferred embodiment of the invention has, on the driven side, the axle shaft rotationally driving a clutch housing, wherein a bending arm, rigidly connected to the axle shaft and constituting an extension thereof, is movable vertically with respect to the rotation axis of the driving axle, thereby producing flexural torque.

Such a bending arm can transmit flexural torque to the axle shaft, of the kind that occurs when driving through a curve or in a sidewardly inclined vehicle. The axle is supported in at least one axle bearing close to its driven end and is connected on the driving side with an axle differential. Advantageously, the clutch housing contains a spherical toothed bearing for the part engaging with the axle shaft, permitting a tilting of this part with respect to the rotation axis. Because of this arrangement, it is possible to transmit the torque without any problems from the shaft to the clutch housing and thereby, in given cases, to all the transmission parts connected therewith, in spite of the flexural torque acting upon the axle shaft and the resulting bending.

It has been proven advantageous and suitable that the axle transmission according to the invention be coupled in series with further transmission elements and at least one loading motor, into a closed-circuit transmission.

As already mentioned, for testing a driving axle in a closed transmission circuit it is necessary to have a driving power sufficient to overcome the total frictional energy produced in a closed-circuit transmission. The loading motor serves for the loading of the individual transmission elements, so that they mesh with the corresponding friction.

A preferred embodiment of the invention is one wherein a loading motor is provided, which in the case of a driving axle having a left and a right axle shaft, is connected on one side with the driven side of one of the axle shafts (the left or the right one) via an intermediate shaft bridging the differential, and on the other side with the driven side of the other (the right or the left) axle shaft.

With the aid of a loading motor arranged as above it is possible to let one of the axle shafts run quicker than the other one. This of course is based on the presumption that a differential gear is provided in the axle, whereby the primary rotational speed is determined by an auxiliary drive of the intermediate shaft. The differential speed of the two axle shafts corresponds to the simulation of driving through a curve. Thereby, additional flexural torque can be transmitted via the aforementioned bending arm to the axle shaft.

A particularly advantageous embodiment of the invention has two driving axles of the same kind with two axle shafts each coupled on the driven side over two steering gear units and wherein one of the driving axles is directly linked to the driving unit and the other driving axles is linked therewith in an indirect driving connection, via a loading motor.

Such a loading motor incorporated in the transmission circuit, can easily produce a bracing between the two axle shafts, so that due to this bracing the axles are driven under similar intrinsic load as the one produced by applying a brake or a generator at the driven end of the axle shafts. However, thereby no surplus of energy should be produced by the driving unit, which subsequently is to be converted in the braking or generator unit into heating energy or partially also into electric energy. The entire testing stand becomes more compact and cost-efficient as a result.

Finally, in the preferred embodiment of the invention it is provided that driving axles of the same kind and an intermediate shaft equipped with a loading motor be arranged in an L-shape, in such a manner that their rotation axes run basically parallel and that the rotation axes of the two driving axles form the terminal points of the L flanks while the rotation axis of the intermediate shaft forms the point where the two L-flanks meets. Because of this arrangement of the driving axles and the intermediate axle, both driving axles are advantageously accessible from above and can be set under load with the crossbar. In this way it is possible to test simultaneously two driving axles.

BRIEF DESCRIPTION OF THE DRAWING

Further advantages, features and application possibilities of the present invention will become clear with the aid of the following description of a preferred embodiment of the device and the accompanying drawing, through which the process is also explained. In the drawing.

SPECIFIC DESCRIPTION

Figure 1:
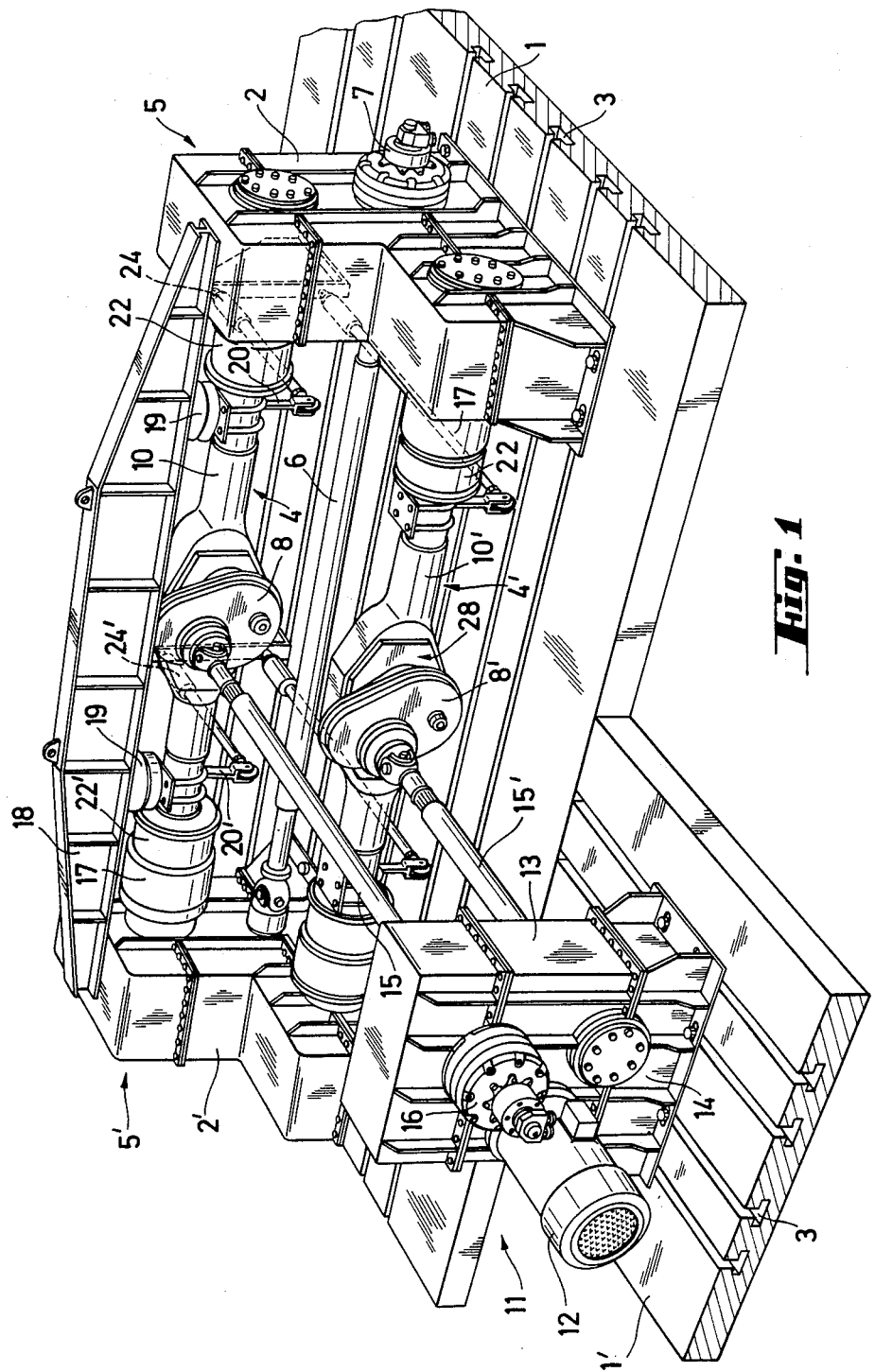
FIG. 1 is a general perspective view of a testing stand with two driving axles.

The entire transmission testing stand is built on a foundation formed by mounting plates 1, 1'. As shown in FIG. 1, on the mounting plate 1 L-shaped frame parts 2, 2' are securely bolted in T-shpaed grooves 3 of the mounting plate 1. The frame segments 2, 2' can slide along the grooves 3, for mounting or dismounting the axles.

Each frame segment 2, 2' comprises a angled gear units 5, 5'. The receiving spaces for the driving axles 4, 4' in the frame segments 2, 2' or the angled gear units 5, 5' are located in the flanks of the L-shaped frame segments. In the corner area of the frame segments 2, 2', where the two L-flanks meet, an intermediate shaft 6 is arranged, which is directly coupled with the angled gear unit 5' and is in driving connection with the angled gear unit 5 via the loading motor 7. By actuating the loading motor 7, the angled gear unit 5 can either lead or trail with respect to the angled gear unit 5', depending on the direction of rotation of the loading motor 7. For the driving axles 4, 4', which with their two driving ends are each in a rigid rotational connection with one of the two angled gear units 5, 5', this is equivalent to the simulation of going through a curve, whereby the differential contained in the axle transmissions 8, 8' balances the difference between the rotation of the left axle shaft with the respect to the right axle shaft 9. The axle shaft 9 is surrounded by the axle housing 10,10' in FIG. 1, while in FIG. 2c it is visible.

The drive unit 11 for the two driving axles 4, 4' consists of a driving motor 12, the return gear 14 arranged in the housing 13 and the loading motor 16. The loading motor has the effect that during driving, between the two driven shafts 15, 15'—from now on referred to only as the cardanic shafts—a rotation is created, which is however limited to the resilience available within the system—consisting of cardanic shafts 15, 15', driving axles 4, 4', steering gears 5, 5' and return gear 14. Thereby, the torque-transmitting components under load work against each other, corresponding to the degree of the load imparted by the loading motor 16. In this way, a realistic testing of the function is possible over the entire area under load. It is self-understood that the angled gear units 5, 5' and the return gear 14 are arranged in such a manner that it is possible to let the driving axles 4, 4' idle, without the actuation of the loading motors 7, 16.

The transmission circuit is built the following way: The driving motor 12 drives the cardanic shaft 15 via the return gear 14, which shaft drives in turn the axle shaft 9 of the driving axle 4, via the axle transmission 8 in the axle housing 10. The axle shafts 9, 9' of the axles 4, 4' are connected over clutch housings 17 with the angled gear units 5, 5'. Via the angled gear units 5, 5', the torque of the axle shafts 9 of the driving axle 4 is transmitted to the axle shafts 9 of the driving axle 4' and reacts on the return gear 14, over the axle transmission 8' of the driving axle 4' via the cardanic shaft 15'. Due to the redirecting in the steering gear units 5, 5' and in the return gear 14, both cardanic shafts 15, 15' and both driving axles 4, 4' and their axle shafts, have the same direction of rotation.

In the above-described transmission circuit, through corresponding actuation of the loading motor 16, the driving axles 4, 4' can be in the driving mode (positive torque load) or in the braking mode (negative torque load). This simulation corresponds in the driving mode (positive torque load) to acceleration processes, normal driving conditions and to up-hill driving with corresponding load assignment.

In the case of braking mode (negative torque load), the conditions correspond to the operational conditions during braking, also by means of motor brake, skidding (e.g. during downhill driving) and reverse driving.

The special advantage of the present test stand and of the testing process performed therewith consists thus in the fact that not only a pure functional testing of the driving unit with respect to the transmission of torque from the driven shaft to the driving wheel takes place, but that an additional loading of the driving axles 4, 4' can be achieved, which corresponds to the actual load to which the driving axles will be subjected when operating in a truck. Over the axle 4, a crossbar 18 can be discerned, which is supported via pneumatic shock-absorbers 19 on the axle housing 10. The crossbar 18 is hydraulically loaded from above, whereby also short-term load alternations are possible. The crossbar 18 does not rest on the frame segments 2, 2', but is carried exclusively by the axle housing 10 or the driving axle 4, via pneumatic shock-absorbers 19.

Further, underneath the pneumatic spring 19, torque stay rods 20, 20' can be seen, and their purpose will be explained later. These are better shown in detail in FIG. 2a, which represents a cross-section through the driving axle 4 along the torque stay rod 20. in FIG. 2a, the axle shaft 9 can be discerned, which runs in axle bearings (not shown in this cross-section) in the axle housing 10. In turn, the axle housing 10 rests upon the axle shafts 9, 9', via axle bearings which among others are located in the area of the wheel mounting 22, 22' (FIG. 1), the axle housing being otherwise freely rotatable. When a torque is transmitted via the cardanic shaft 15, the axle transmission 8 and the axle shaft 9, against a corresponding resistance, to the driven end of the axle shaft 9—which corresponds to starting, accelerating or also to maintaining a certain speed by overcoming air- and rolling-friction forces—this torque transmitted on the driven side causes a countertorque acting first on the over the axle bearings and the axle transmission 8 on the axle housing 10, attempting to rotate the latter in the opposite direction. Since the axle housing 10 is connected to the vehicle frame generally through (not represented) plate springs or other force- and torque-transmitting elements, this torque is absorbed by the entire vehicle. This torque is also expressed during high acceleration by the dipping of the vehicle tail respectively the rising of its front portion.

In the state of the art testing stands, the axle housing is rigidly mounted in the test stand and the torque is absorbed by the frame of the test stand or the like. In the present test stand, the already mentioned torque stay rods 20, 20' are provided for the absorption of the torque. Each torque stay rod 20, 20' is connected via a respective lever 23 (in the schematic representation of FIG. 2a, only the lever 23 for the torque stay rod 20 is shown), to the assigned force transmission element 24, 24', which can be connected to the frame segments 2, 2'.

The effective length of the lever 23 (marked with "x") i.e. the distance between the rotation axis 25 and the application point of the force transmission element 24, corresponds exactly to the distance of the wheel contact area 27 of a driving wheel 21 provided for the driving axle. The driving wheel 21 is shown in broken lines for a better understanding. The actual presence of a driving wheel is otherwise not required in a test stand and also not provided.

Since the reaction torque, i.e. the torque acting on the axle housing 10 (arrow 46) is equal to the driving torque (arrow 45) based on the Newtonian principle action=-reaction, the force (arrow 31) measured in the force transmission element 24 corresponds also to the propulsive force acting upon the vehicle, respectively upon the axle bearings (not represented here). Together with the loading of the axle housing 10, respectively the axle bearings, via the crossbar 18 and the pneumatic shock absorbers 19, 19', the axle bearings of the axle 4, 4' (due to the incorporation of a further crossbar) are additionally loaded with the propulsive forces produced during driving, which are measurable with the aid of the force transmission elements 24, 24'.

Figure 2:
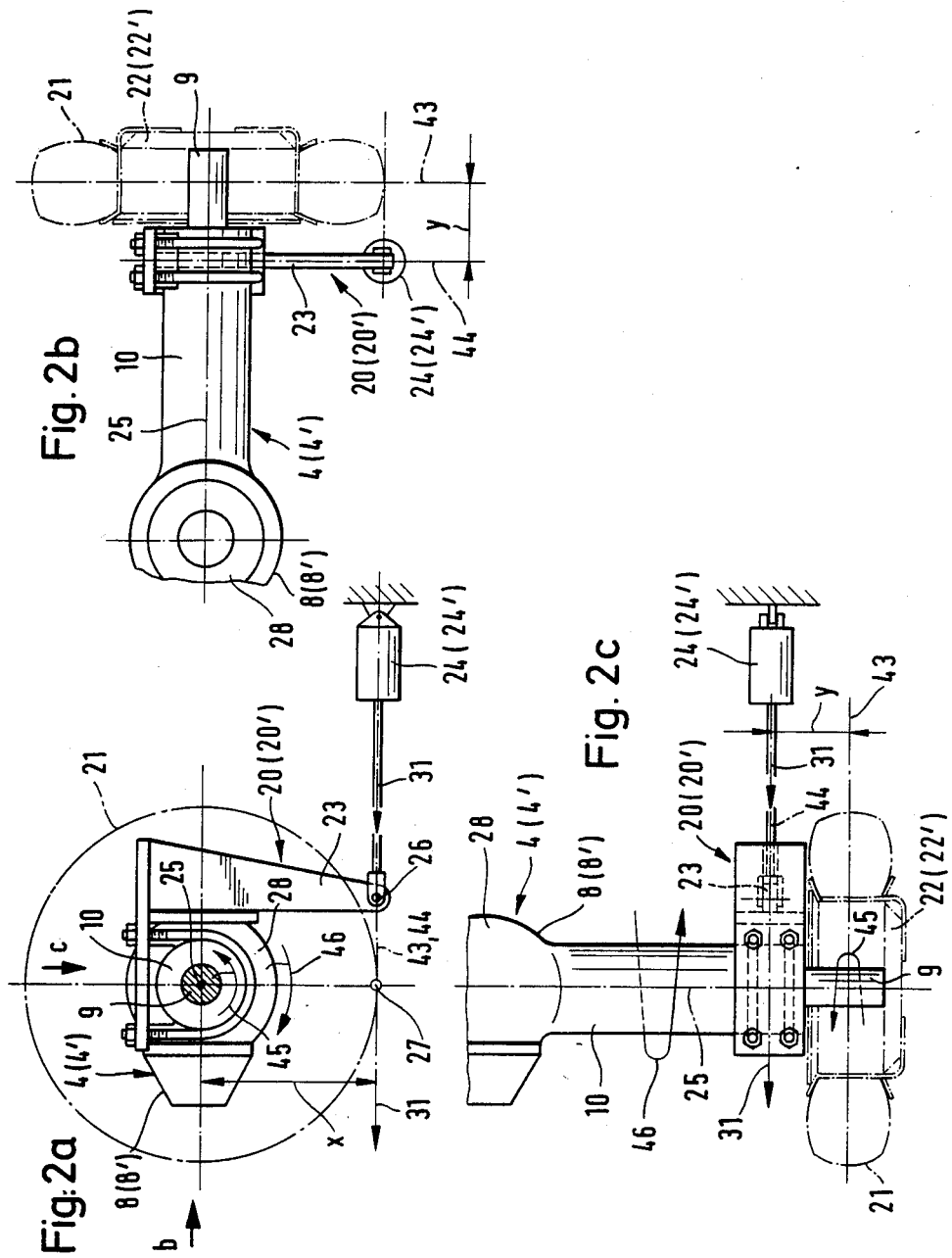
FIG. 2a is a schematic cross section of an axle in the area of the torque stay rod.
FIG. 2b is a schematic frontal view of a left axle half.
FIG. 2c is a top view of the apparatus shown in FIG. 2b.

In the schematic illustration of FIGS. 2b and 2c, the arrangement of the torque stay rod 20 with respect to the axles 4, 4', respectively their differential gearing 28 and the contact level 43 of the wheel 21. The reaction force to the torque appears—such as shown by arrow 31—in the torque stay rod level 44. Due to the distance "y" between the wheel contact level 43 and the torque stay rod level 44, a loading torque similar to the one existent during vehicle operation, acts upon the axle shaft 9 or axles 4, 4'.

Figure 3:
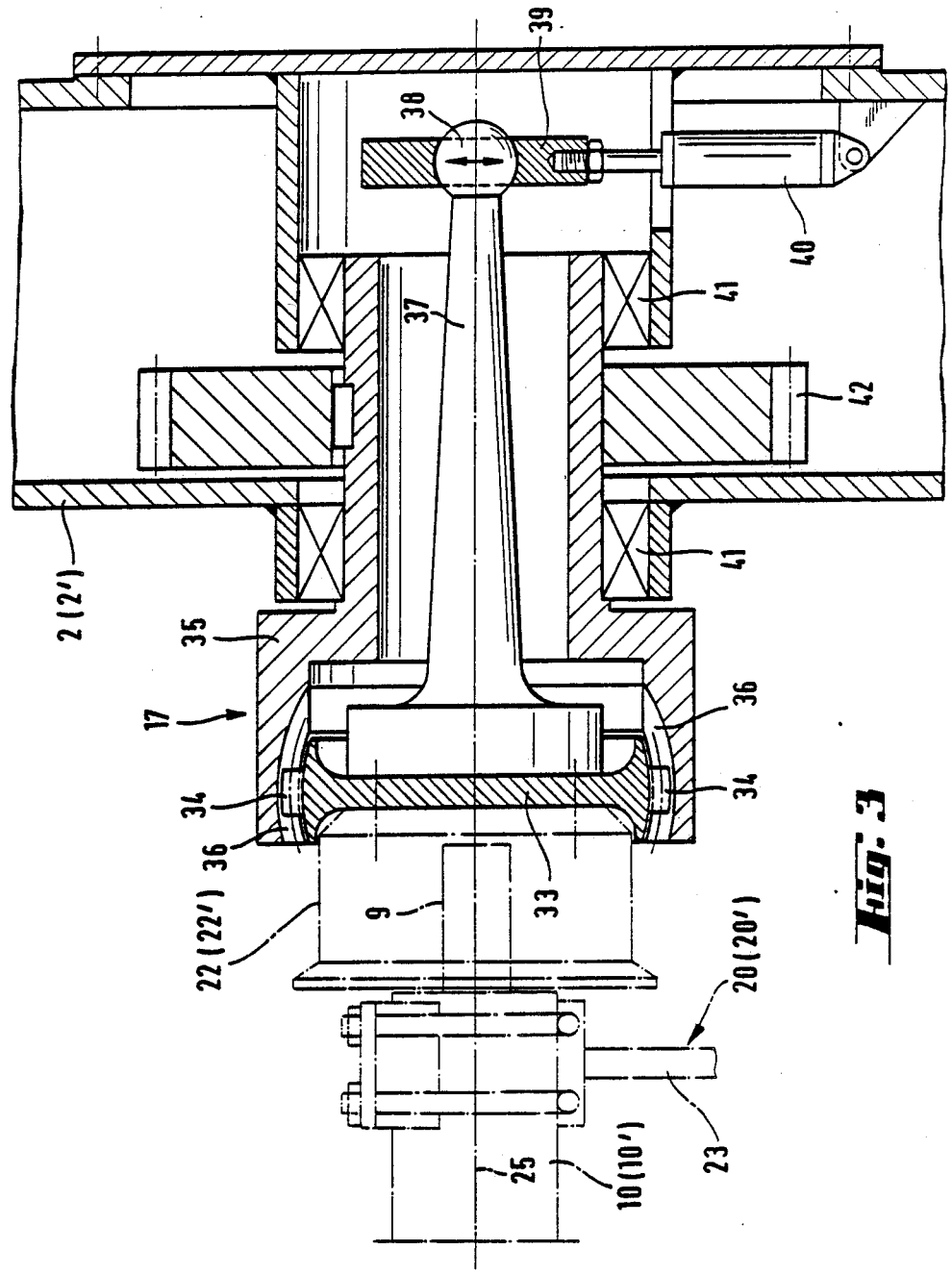
FIG. 3 is a diagrammatic cross sectional view of clutch housing for receiving the driven end of an axle.

FIG. 3 shows the already mentioned clutch housing 17, through which the axle shaft 9 is connected to the angled gear unit 5 or 5' (FIG. 1). The axle shaft 9 is connected rigidly, via wheel mounting 22, 22', to a wheel center disk 33 which corresponds to the wheel center disk of a vehicle. However, in this case the wheel center disk 33 differs an actual wheel disk from, since it has a spherically shaped toothing 34, which, together with a correspondingly shaped toothing in the bearing housing 35, forms a spherical toothed bearing 36. The spherical design of the toothed bearing 36 makes possible the tilting of the wheel center disk 33 with respect to the rotation axis 25. When going through a curve or when the vehicle is in an inclined position on a grade, due to the vehicle mass, forces are produced which act upon the wheel center disk 33 via the lever arm formed by the wheel contact area 27 (FIG. 2a) and the rotation axis 25, thus inducing a moment in the wheel center disk 33. In this way, the axle shaft 9 is correspondingly set under load. Such flexural torque acting upon a wheel center disk can also be simulated realistically, with the aid of the clutch housing 17, assisted by the bending arm 37. For this purpose, the external end of the bending arm 37 is provided with a spherical head 38, as shown in FIG. 3, which is correspondingly supported at 39 and is also designed as a spherical bearing. The desired, respectively required flexural torque acting on the axle shaft 9 is produced by the hydraulic cylinder 40, which is linked to this bearing.

The shaft 9 thereby drives the bearing housing 35, via wheel center disk 33 and its toothing 34, the bearing housing being supported in the bearing 41 and standing in a form-locking rotational connection with the remaining parts of the angled gear units 5, 5', via gear 42.

The loading motor 7 is connected with one of its driving elements to the angled gear unit 5, while the other driving element of the loading motor 7 is connected to the opposite angled gear unit 5' via intermediate shaft 6. When the loading motor is actuated, it produces a relative rotation between its driving elements, so that the angled gear units 5, 5' are no longer synchronized, but one rotates quicker than the other. As a result, the driving shafts 9 on the one side of the driving axles 4, 4' rotate more rapidly than on the other side. These rotational movements with a different speed are made possible by the differential in the axle transmissions 8, 8'. Such an operation corresponds to going through a curve, whereby the operational rotational speed of the intermediate shaft 6 is imparted by an auxiliary drive (not shown).

The loading motor 7 is a hydraulic loading motor with infinite angle of rotation, i.e. it is possible to simulate curve rides of desired length, or also wheel failure. In opposition thereto, the loading motor 16 needs only a very small angle of rotation, but it can also be a hydraulic loading motor with infinite angle of rotation, like the loading motor 7.

In conclusion, with the presently described test stand and the corresponding process, two driving axles can be simultaneously tested, whereby all the static and dynamic loads, to which the axle is subjected during operation, can be realistically simulated, and, at the same time these loads can be precisely measured, in order to make possible to judge the finishing inaccuracies in the evaluation measurement data. The concept of finishing inaccuracies encompasses in the largest sense all sources of failure, which can result from for instance tolerances, material failure, and so on and can show up in the various components.

I claim:

1. A method of testing driving axles for motor vehicles, comprising the steps of:
   mounting at least one driving axles in respective gear units at opposite ends in a test stand so that said axle has opposite axle shaft ends at said gear units and an axle housing extending between said units and supported on said stand;
   connecting a drive motor to one of said ends through one of said units and a load to the other of said ends through another of said units for driving said axle while loading same; and
   applying to said axle on said test stand a plurality of other forces independent of forces applied by said drive motor and load and sufficient to enable testing of total function of the axle under simultaneous drive and carrying conditions, the application of said other forces including application to said shaft ends of dynamic lateral forces corresponding to wheel-disk reaction forces applicable to the axle in use.

2. The method defined in claim 1 wherein said application of other forces includes application to said axle of a predetermined static force and, in addition to said predetermined static force an additional load selectable as to magnitude and frequency.

3. The method defined in claim 2 wherein said application of other forces includes application to said axle of propulsive forces.

4. The method defined in claim 3 wherein said application of other forces includes application to said axle of flexural torque.

5. A method of testing driving axles for motor vehicles, comprising the steps of:
   mounting at least one driving axles in respective gear units at opposite ends in a test stand so that said axle has opposite axle shaft ends at said gear units and an axle housing extending between said units and supported on said stand;
   connecting a drive motor to one of said ends through one of said units and a load to the other of said ends through another of said units for driving said axle while loading same, and mechanically coupling said drive motor to said load to form with said axle a closed transmission circuit loading said axle by tensioning across said opposite ends; and
   applying to said axle on said test stand a plurality of other forces indpendent of forces applied by said drive motor and load and sufficient to enable testing of total function of the axle under simultaneous drive and carrying conditions.

6. The method defined in claim 5 wherein at least two axles to be tested are mounted in said transmission circuit in a row.

7. The method defined in claim 6 wherein the application of said other forces includes application to said shaft ends of dynamic lateral forces corresponding to wheel-disk reaction forces applicable to the axles in use.

8. The method defined in claim 8 wherein said application of other forces includes application to said axles of a predetermined static force and, in addition to said predetermined statis force an additional load selectable as to magnitude and frequency.

9. The method defined in claim 8 wherein said application of other forces includes application to said axles of propulsive forces.

10. The method defined in claim 9 wherein said application of other forces includes application to said axle of flexural torque.

11. An apparatus for testing driving axles for motor vehicles, comprising:
    a test stand having a base and a pair of gear units spaced apart on said base;
    means for mounting at least one driving axle in said gear units at opposite ends so that said axle has opposite axle shaft ends at said gear units and an axle housing extending between said units;
    a drive motor connected to one of said gear units and to one of said ends through said one of said units and means for connecting a load to the other of said ends through another of said units for driving said axle while loading same; and
    means on said stand engageable with said housing and with said shaft ends for applying to said axle on said test stand a plurality of other forces independent of forces applied by said drive motor and load and sufficient to enable testing of total function of the axle under simultaneous drive and carrying conditions, said means for applying said other forces including means for application to said shaft ends of dynamic lateral forces corresponding to wheel-disk reaction forces applicable to the axle in use.

12. The apparatus defined in claim 11 wherein said means for applying said other forces includes a crossbar disposed above said axle housing, and spring elements connecting said axle housing to said crossbar.

13. The apparatus defined in claim 11 wherein said means for applying said other forces includes a lever having a length of half a diameter of said wheel connected to said housing, and a force transmission element oriented generally in a tangential direction with respect to the orientation of said wheel connected to said lever and displacing same to apply torque to said housing.

14. The apparatus defined in claim 11 wherein said means for applying said other forces includes a clutch housing connected to said axle at said other of said ends and enclosing a bending arm rigidly connected to said other of said ends and displaceable perpendicularly to a rotation axis of said axle shaft ends.

15. The apparatus defined in claim 14 wherein said clutch housing contains a spherical toothed bearing for a wheel-center disk and means enabling tilting of said disk.

16. The apparatus defined in claim 11 wherein said load includes transmission elements connected to said motor whereby said motor, said axle and said transmission elements form a closed transmission circuit.

17. The apparatus defined in claim 11 wherein said load includes means for connecting a second driving axle in series with the first mentioned driving axle.

18. The apparatus defined in claim 17 wherein said means includes an intermediate shaft between said gear units parallel to said axis and said load further includes a load motor operatively connected to said intermediate shaft.

* * * * *